Figure 1:
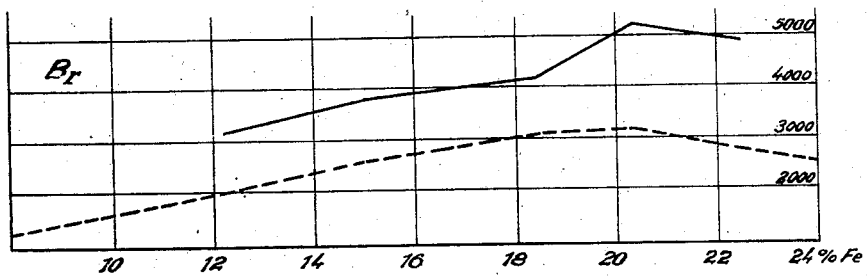

July 26, 1938.    A. BÜCHNER ET AL    2,124,607
METHOD FOR MANUFACTURING PERMANENT MAGNETS
Filed Oct. 17, 1936    2 Sheets-Sheet 1

Patented July 26, 1938

2,124,607

UNITED STATES PATENT OFFICE 2,124,607

METHOD FOR MANUFACTURING PERMANENT MAGNETS

Artur Büchner and Hans Neumann, Berlin-Siemensstadt, and Hermann Reinboth, Berlin, Germany, assignors to Siemens & Halske Aktiengesellschaft, Siemensstadt, near Berlin, Germany, a corporation of Germany Application October 17, 1936, Serial No. 106,104
In Germany June 3, 1936

9 Claims. (Cl. 148—11.5)

Our invention relates to a method for manufacturing permanent magnets having a great coercive force and a strong remanent magnetism.

Permanent magnets are known which, in addition to iron and iron-cobalt, contain a great amount of aluminum or titanium or of both these metals. The coercive force and the remanent magnetism of these magnets are higher than the corresponding properties of the usual magnet steels of martensitic character. These magnetically high-grade alloys are, however, so hard and brittle that it is practically impossible to machine them and they must be given their final form in casting. This renders the manufacture of certain forms of magnets both difficult and expensive. There are also difficulties when the magnets are highly stressed mechanically during use, for instance, when they are subjected to continuous vibrations or stressed by centrifugal forces—as for example in electric machines. Such stresses may lead to the destruction of the magnets.

It has already been proposed to use alloys of iron, nickel and copper for making permanent magnets. These alloys have the advantage that they can be machined; their magnetic values, however, hitherto have been unfavorable.

An object of my invention is to provide permanent magnets which as regards coercive force and remanent magnetism have substantially similar magnetic properties as the known high-grade aluminum or titanium steels, and which after casting can be machined by cutting tools, drills and the like or which can be formed by bending, forging or like operations.

A further object of the invention is to improve the magnetic properties of the known type of permanent magnets containing nickel and copper in which the percentage of iron is lower than the total percentage of the other constituents.

We have found that machineable permanent magnets having particularly favorable magnetic properties can be produced from alloys containing 10 to 50% nickel, 20 to 75% copper and over 5% of at least another metal of the iron group, especially iron or iron and cobalt, by first subjecting this alloy to a cold rolling process reducing the alloy with a rolling degree of over 40%, and by further subjecting the rolled alloy to a heat treatment which must comprise at least heating the alloy to a temperature above 500 degrees centigrade. The initial thickness of the body produced from the above-mentioned alloy must, in other words, be reduced by the rolling process to 60% of the original thickness. In some cases it is advisable to use a still higher rolling degree particularly above 70%, i. e., to reduce the initial thickness of the alloy to 30% and less.

The method may be still improved by refining the alloys before cold rolling them. In this case our invention provides two heat treatments, one of which being effected before and the other after cold rolling the alloys.

For the manufacture of permanent magnets copper-nickel-iron alloys have proved particularly suitable which may contain other metals, such as cobalt or beryllium. Permanent magnets according to the invention present particular advantages when manufactured from alloys consisting of 15 to 40% nickel, 5 to 30% iron and the remainder of copper.

The essential improvements as regards the magnetic properties obtained according to the invention by cold rolling and heat treating will appear from different examples hereinafter described.

The drawings show some graphs illustrating the properties of materials produced by the method according to the invention. Fig. 1 refers to the residual magnetism, Fig. 2 to the magnetic saturation, and Fig. 3 to the magnetic power of some iron, nickel, copper alloys. Figs. 4a and 4b illustrate the dependency of the magnetic power on the rolling degree, and Fig. 5 the same magnetic property in dependency on the iron content in case of a constant nickel content.

Figure 2:
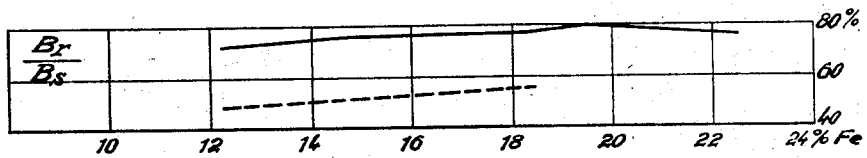
Figure 3:
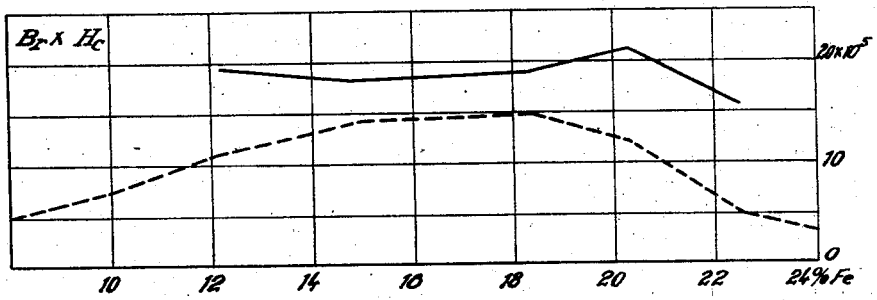
Figure 4A:
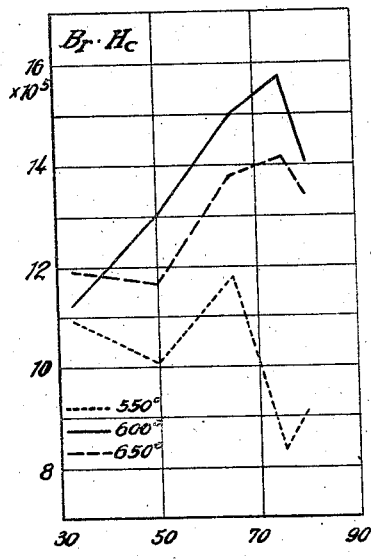
Figure 4B:
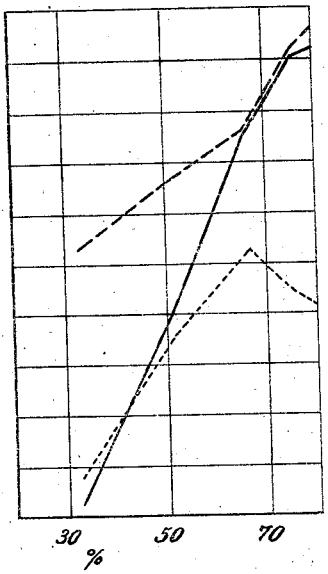

More in detail, Figs. 1 to 3 are graphic representations of the influence of the iron content at a constant nickel content of 20% on the magnetic properties of the alloy in cast and in rolled state. By a rolled alloy is understood an alloy which, after being rolled, is subjected to a heat treatment according to the invention.

Fig. 1 shows the relation between the residual magnetism $B_r$ and the iron content. The full line represents the alloy treated according to the invention, whereas the dash line represents the magnetic properties of the alloy after casting, i. e. before being treated according to the invention. As will be apparent the residual magnetism of the alloy when rolled is approximately 50% higher than when only cast.

The rolling operation influences also the ratio of the residual magnetism to the saturation $$\left(\frac{B_r}{B_s}\right)$$

This is shown in Fig. 2 in which the full line and the dash line represent the variation of this ratio for the alloy when cold rolled and when cast respectively. As will be seen the residual magnetism of the alloy when cast amounts approximately to 50 to 55% of the saturation, whereas when cold rolled it is increased to about 75 to 80%.

The coercive force is only slightly affected by the rolling operation.

Owing to the great increase in the residual magnetism due to the heat treatment also a considerable increase in the magnetic power $B_r \times H_c$ is obtained as shown in Fig. 3. It is readily apparent that the rolling operation in connection with the annealing treatment influences the magnetic properties of the alloy in an extremely favorable manner.

A further advantage of the rolled and then annealed material as compared to the same material when only cast, lies in the fact that the demagnetization curves of the rolled samples are more bulged than those of the cast samples. This means that the magnetic power—$(BH)_{max}$—has increased to a further amount so that the optimum values lie 100 to 200% above the maximum values attained with the cast samples. In this manner the values of the highly alloyed cobalt steel are approximately attained.

In the above-given explanations, only the maximum values attained with alloys in rolled and non-rolled state have been considered and compared with each other. The influence of the rolling degree and the annealing temperature on the material to be treated will now be described more in detail.

Figs. 4a and 4b are graphic representations of the relation between the magnetic power $B_r \times {}_BH_c$ and the rolling degree. (${}_BH_c$ denotes hereinafter the coercive force for the induction $B=O$, whereas ${}_JH_c$ denotes the coercive force for the magnetization $J=O$. The difference between ${}_BH_c$ and ${}_JH_c$ must be considered in the case of alloys having a very great coercive force, since in these alloys both values may considerably differ from one another.) Fig. 4a indicates the values for an alloy consisting of 57.5% copper, 20% nickel and 22.5% iron which, after being cold rolled, has been annealed for one hour at a temperature between 600 and 650 degrees centigrade, whereas Fig. 4b represents the values for an alloy which has been annealed before and after cold rolling. The curves shown in each graph were obtained at different annealing temperatures. The abscissas of both graphs indicate the rolling degree in percentage.

As will be seen from Fig. 4b the magnetic power in the samples annealed before and after the cold rolling operation increases rather uniformly up to a rolling degree of 65%. The magnetic power according to Fig. 4a upon exceeding a maximum value decreases with a further increasing rolling degree.

Figure 5:
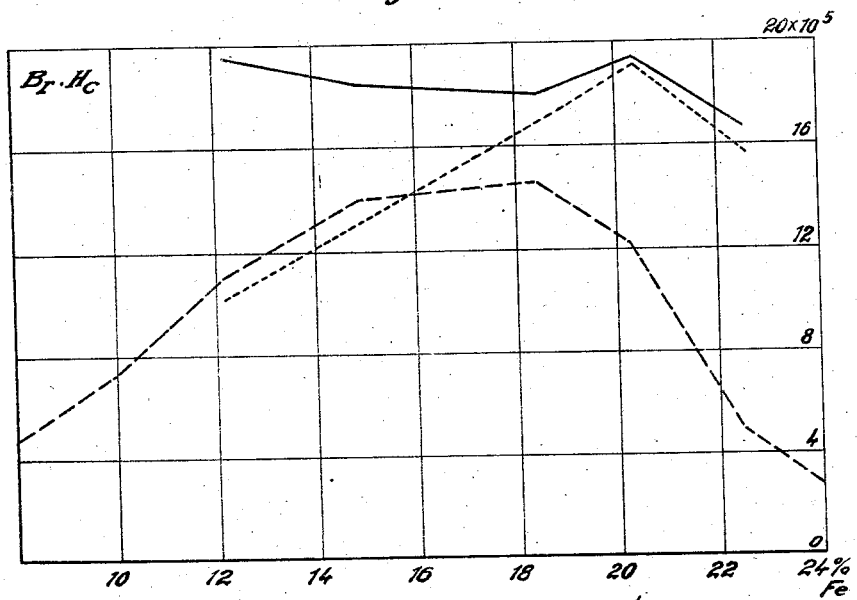

Fig. 5 is a graphic representation of the relation between the magnetic power and the iron content at a constant nickel content of 20%. Here the dash curve represents the magnetic values of the sample when only cast, whereas the dotted line the values for a material which was annealed after being rolled. The full line finally shows the magnetic values for a material which has been annealed before and after rolling the same. From the curves obtained it will be seen that by annealing the material twice the maximum values for the magnetic power will be attained. It is evident that in this case also the residual magnetism and the coercive force attain their maximum values. By this annealing treatment the further advantage is obtained that the favorable magnetic values may still be enhanced by choosing corresponding, if desired different, annealing temperatures and periods.

Furthermore, we have found that corresponding improvements may also be attained in other alloys composed essentially of copper-nickel.

Thus, for instance, an alloy containing 56¾% copper, 25% nickel, 18% iron and ¼% beryllium if annealed before and after cold rolling has a residual magnetism of 5000 and a coercive force of 350 and, therefore, a magnetic power of $17.5 \times 10^5$, whereas the corresponding values, if the alloy is only cast, amount only to 3400, 310 and $10.5 \times 10^5$ respectively.

An alloy consisting of 60% copper, 21% nickel, 14% iron and 5% cobalt, after being cast, had the following values: $B_r = 3100$, ${}_BH_c = 400$ and $B_r \times {}_BH_c = 12.4 \times 10^5$, which by cold rolling and a following annealing of the alloy increased to 4250, 370 and $15.7 \times 10^5$, and which by annealing the alloy before and after cold rolling amounted to 3800, 540 and $20.5 \times 10^5$.

In the case of an admixture of metals which are metallurgically similar to cobalt and beryllium, very high values, particularly as regards the residual magnetism and magnetic power, can also be attained.

The values of permeability of the material treated according to the invention are different in the rolling direction and at right angle thereto, which is essential to certain cases of application. These differences may be considerably greater than 100%.

In some cases the magnetic properties may be further improved by heating the alloys previous to the cold rolling operation to temperatures lying between about 1000 degrees centigrade and the melting point, quenching the alloys and then cold rolling them. The alloys are preferably quenched in liquid, such liquids being particularly favorable which, as oil, have a smaller heat conductivity than water. It is not absolutely necessary that the temperature of the quenching liquid be the same as the room temperature. In several cases favorable values of magnetic properties have been attained with quenching liquids, the temperature of which lay considerably above the room temperature, for instance, with a salt bath, the temperature of which lay between 150 and 400 degrees centigrade.

An alloy of 20% nickel, 20% iron and 60% copper was cast into bars of a diameter of 43 mm. The bars were first rolled to a diameter of 23 mm. The magnets thus preformed were annealed at a temperature of 1050 degrees centigrade for ten hours, whereby the material was homogenized. After annealing the bars were quenched, then reduced by rolling to a diameter of 10.7 mm., annealed at a temperature of 600 degrees centigrade for an hour and finally allowed to cool down in air. The last cooling down of the bars after the annealing treatment has no effect on the magnetic properties.

With the magnets thus manufactured the following magnetic values were obtained:

Residual magnetism _____ $B_r = 5280$
Induction coercive force _____ ${}_BH_c = 453$ (for $B = 0$)
Magnetization coercive force _ ${}_JH_c = 466$ (for $I = 0$)
Magnetic power _____ $(BH)\max = 1.07 \times 10^6$
Bulge factor _____ $\gamma = 45\% \dfrac{(BH)\max}{B_r \times {}_BH_c}$ From the last-mentioned value it will be apparent that the magnetization curve is strongly bulged so that a very high energy content is obtained in comparison with the coercive force and the residual magnetism.

In addition to the improvement of the magnetic properties, the invention makes it possible to produce permanent magnets, the wall thickness of which is very small. As an example, it may be mentioned that the material given in detail in the above-described example was rolled down to a thickness of 0.2 mm. The method was otherwise carried out exactly in the same manner as with the example dealt with above. The thin and easily flexible plate thus produced had the following magnetic values:

$$B_r = 5020$$
$$_BH_c = 432$$
$$_JH_c = 1.0 \times 10^6$$
$$\gamma = 46\%$$

Such favorable results have never been obtained with alloys hitherto known for permanent magnets in case of plates of so thin a wall thickness.

In some cases, an additional annealing treatment may be effected between the quenching and the rolling operations. This annealing treatment which takes place before the rolling operation, is to be effected at a temperature of 500 to 700 degrees centigrade, particularly of 600 to 650 degrees centigrade, at which temperature also the annealing is effected after rolling.

The rapidity with which the quenching is effected and the duration of the heating and the annealing depend upon the thickness of the body to be treated.

When producing alloys containing about 60% copper, about 20% nickel and about 20% iron the coercive force is increased and at the same time the residual magnetism is reduced by lowering the iron content while maintaining the nickel content constant. When the iron content is increased to too great a value both the coercive force and the residual magnetism decrease.

As the examples show the magnetic properties of the magnets made according to the invention are substantially the same as those inherent in magnets made from the known nickel or nickel-cobalt steels containing aluminum or titanium. The magnets according to the invention have, however, the advantage that they may easily be machined.

The permanent magnets according to the invention are particularly advantageous for electricity meters, moving coil galvanometers, oscillographs, polarized relays, motors, generators, tachometers, magneto and other inductors, electromagnetic and electrodynamic telephones, loudspeakers and microphones, magnetic couplings for measuring and controlling purposes, rotary magnets for signal transmitters employed in signalling systems etc. The magnetic alloys made according to the invention are particularly advantageous for magnets used in connection with revolving parts which are highly stressed, as well as for magnets which owing to the complicated form thereof or to the necessity of drilling and milling operations or the like, are very difficult to be produced by mere casting.

We claim as our invention:

1. The method of manufacturing machineable permanent magnets consisting in annealing an alloy containing about 20% nickel, about 20% iron and about 60% copper to a temperature of about 1,000 degrees centigrade, quenching said alloy in liquid, cold rolling the alloy with a rolling degree of over 40% and annealing the same to a temperature between 600 and 650 degrees centigrade.

2. The method of manufacturing machineable permanent magnets, consisting in cold rolling an alloy composed of 20 to 80% copper, 10 to 50% nickel, the remainder consisting of over 5% of at least one metal selected from the group consisting of iron and cobalt, and of at most 5% other ingredients, with a rolling degree higher than 40%, and heating the rolled alloy to a temperature between 500° and 800° C.

3. The method of manufacturing permanent magnets, consisting in cold rolling an alloy of 20 to 80% copper, 10 to 50% nickel, the remainder iron and at most 5% of other ingredients, with a rolling degree of over 70%, and annealing the rolled alloy to a temperature between 500 and 850° C.

4. The method of manufacturing permanent magnets from an alloy composed of 15 to 40% nickel, 5 to 30% iron, 30 to 80% copper, and from traces to 5% of usual additions and impurities, consisting in annealing said alloy to a temperature between 500 and 700° C., cold rolling said alloy with a rolling degree of over 40%, and annealing the rolled alloy to a temperature between 500 and 700° C.

5. The method of manufacturing permanent magnets from an alloy composed of 20 to 80% copper, 10 to 50% nickel and the remainder over 5% iron and from traces to 5% additions and impurities, consisting in annealing said alloy at a temperature above 950° C., quenching said alloy, cold rolling said alloy with a rolling degree of over 40%, and finally annealing said rolled alloy to a temperature between 500 and 850° C.

6. The method of manufacturing permanent magnets from an alloy composed of 20 to 80% copper, 10 to 50% nickel and a remainder of over 5% iron and from traces to 5% additions and usual impurities, consisting in annealing said alloy at a temperature between about 1000° C. and the melting point, quenching said alloy in liquid, cold rolling the alloy with a rolling degree above 40% and annealing the same to a temperature between 500° and 850° C.

7. The method of manufacturing permanent magnets composed of more than 20% copper, 10 to 50% nickel and more than 5% of at least one metal selected from the group consisting of iron and cobalt, comprising the steps of annealing said alloy at a temperature between about 1000° C. and the melting point, quenching the same, annealing the same to a temperature between 500 and 700° C., cold rolling said alloy with a rolling degree of over 40%, and re-annealing said alloy to a temperature between 500 and 700° C.

8. The method of manufacturing permanent magnets composed of 20 to 80% copper, 10 to 50% nickel, the remainder containing over 5% of at least one metal selected from the group consisting of iron and cobalt, and from traces to 5% other additions and impurities, consisting in annealing said magnet at a temperature between about 1000° C. and the melting point, quenching said magnet in a liquid having a smaller heat conductivity than water, cold rolling said alloy with a rolling degree of over 70%, and annealing the quenched magnet at a temperature between 500 and 850° C.

9. In the method of manufacturing permanent magnets from an alloy composed of 20 to 80% copper, 15 to 40% nickel, over 5% iron and over 1% cobalt, the steps consisting in annealing said alloy at a temperature between about 1000° C. and the melting point, cold rolling the same with a rolling degree of over 40%, and heating the rolled alloy to a temperature between 500° and 850° C.

ARTUR BÜCHNER.
HANS NEUMANN.
HERMANN REINBOTH.